US012627769B1

(12) United States Patent
Hong et al.

(10) Patent No.: US 12,627,769 B1
(45) Date of Patent: May 12, 2026

(54) VIDEO INTERCOM COMMUNICATION FOR VOIP DEVICE

(71) Applicant: Zoom Communications, Inc., San Jose, CA (US)

(72) Inventors: Karen Kuei Ren Hong, Los Altos, CA (US); Kwan Seng Low, San Jose, CA (US); Hui Sun, Hefei (CN); Chunsong Zhu, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 169 days.

(21) Appl. No.: 18/427,049

(22) Filed: Jan. 30, 2024

(51) Int. Cl.
| | |
|---|---|
| *H04N 7/15* | (2006.01) |
| *H04L 65/1069* | (2022.01) |
| *H04L 65/1104* | (2022.01) |
| *H04N 7/14* | (2006.01) |

(52) U.S. Cl.
CPC ........... *H04N 7/15* (2013.01); *H04L 65/1069* (2013.01); *H04L 65/1104* (2022.05); *H04N 7/147* (2013.01)

(58) Field of Classification Search
CPC .......... G08B 13/1672; G08B 13/19658; H04L 12/66; H04L 45/302; H04L 51/04; H04L 65/1059; H04L 65/1069; H04L 65/1104; H04L 65/4053; H04L 65/65; H04L 65/80; H04L 12/1895; H04L 12/2829; H04L 12/2803; H04L 67/51; H04L 67/53; H04L 69/18; H04M 3/4931; H04M 11/064; H04M 1/185; H04M 3/436; H04M 3/50;

H04M 3/566; H04N 5/45; H04N 7/147; H04N 7/15; H04N 7/186; H04N 13/351; H04N 21/2662; H04N 21/42203; H04S 7/303; H04W 4/80; G06Q 30/0601; G16H 10/60
See application file for complete search history.

(56) References Cited

U.S. PATENT DOCUMENTS

| | | | |
|---|---|---|---|
| 9,058,738 B1 | 6/2015 | Scalisi | |
| 10,805,536 B2 | 10/2020 | Chen et al. | |
| 2003/0091162 A1* | 5/2003 | Haun ................... | H04M 11/064 |
| | | | 379/80 |
| 2004/0086093 A1* | 5/2004 | Schranz .............. | H04L 12/1895 |
| | | | 340/531 |
| 2005/0240680 A1* | 10/2005 | Costa-Requena ........................... | |
| | | | H04L 12/2803 |
| | | | 709/250 |

(Continued)

FOREIGN PATENT DOCUMENTS

CN          105684407 A       6/2016

*Primary Examiner* — Gerald Gauthier
(74) *Attorney, Agent, or Firm* — Young Basile Hanlon & MacFarlane, P.C.

(57) ABSTRACT

A first invite message is received from an intercom device to establish an audio call with a voice over internet protocol (VOIP) device. A second invite message is transmitted to the VOIP device in response to receiving the first invite message. The second invite message indicates the first invite message from the intercom device to establish the audio call. The audio call is elevated to a video call based on a determination that the intercom device and the VOIP device have video capability. A third invite message is transmitted to the intercom device that indicates elevation of the audio call to a video call. Video data is received from the intercom device and forwarded to the VOIP device.

20 Claims, 10 Drawing Sheets

(56) References Cited

U.S. PATENT DOCUMENTS

| | | | | |
|---|---|---|---|---|
| 2006/0128364 A1* | 6/2006 | Costa-Requena | ....... | H04L 67/51 |
| | | | | 455/414.3 |
| 2006/0245574 A1* | 11/2006 | Phelps | ................ | H04M 3/50 |
| | | | | 379/229 |
| 2007/0019571 A1* | 1/2007 | Stogel | ................ | H04L 69/18 |
| | | | | 370/260 |
| 2007/0025278 A1* | 2/2007 | McRae | ............. | H04L 65/1104 |
| | | | | 370/260 |
| 2008/0031169 A1* | 2/2008 | Shi | ................ | H04L 45/302 |
| | | | | 370/310 |
| 2008/0056232 A1* | 3/2008 | Koon | ............... | H04L 65/1104 |
| | | | | 370/352 |
| 2008/0101339 A1* | 5/2008 | Forbes | ................ | H04L 12/66 |
| | | | | 370/352 |
| 2008/0139184 A1* | 6/2008 | Mottes | ............... | H04M 3/436 |
| | | | | 455/414.1 |
| 2008/0158336 A1* | 7/2008 | Benson | ............... | H04L 51/04 |
| | | | | 348/14.08 |
| 2009/0231415 A1* | 9/2009 | Moore | ............. | H04N 21/2662 |
| | | | | 348/E7.083 |
| 2010/0149302 A1* | 6/2010 | Malik | ............. | H04N 21/42203 |
| | | | | 348/E7.083 |
| 2010/0191608 A1* | 7/2010 | Mikkelsen | ........ | G06Q 30/0601 |
| | | | | 705/26.1 |
| 2011/0090334 A1* | 4/2011 | Hicks, III | ....... | G08B 13/19658 |
| | | | | 379/44 |
| 2012/0081501 A1* | 4/2012 | Benzaia | ............. | H04L 65/1059 |
| | | | | 709/228 |
| 2013/0147902 A1* | 6/2013 | Weiser | ............... | H04L 65/1104 |
| | | | | 348/E7.083 |
| 2014/0184730 A1* | 7/2014 | Liu | ..................... | H04N 13/351 |
| | | | | 348/14.08 |
| 2015/0035987 A1* | 2/2015 | Fernandez | ............ | H04N 7/186 |
| | | | | 348/156 |
| 2015/0074259 A1* | 3/2015 | Ansari | ................ | H04M 15/74 |
| | | | | 709/224 |
| 2015/0347683 A1* | 12/2015 | Ansari | ................ | G16H 10/60 |
| | | | | 726/7 |
| 2016/0142591 A1* | 5/2016 | Modai | ..................... | H04N 5/45 |
| | | | | 348/14.08 |
| 2016/0373909 A1* | 12/2016 | Rasmussen | ............ | H04W 4/80 |
| 2017/0309142 A1* | 10/2017 | Phillips | ............. | G08B 13/1672 |
| 2017/0344703 A1* | 11/2017 | Ansari | ................... | H04L 67/53 |
| 2018/0027027 A1* | 1/2018 | Leung | ................... | H04L 65/65 |
| 2019/0058783 A1* | 2/2019 | Reid | ................... | H04M 1/185 |
| 2021/0218571 A1* | 7/2021 | Ansari | ............... | H04M 15/705 |
| 2022/0124203 A1* | 4/2022 | White | .................. | H04M 3/566 |
| 2022/0208319 A1* | 6/2022 | Ansari | ............... | H04L 12/2829 |
| 2023/0208921 A1* | 6/2023 | Dickins | .................. | H04S 7/303 |
| | | | | 381/95 |
| 2024/0121344 A1* | 4/2024 | Hong | ................. | H04L 65/4053 |
| 2024/0422297 A1* | 12/2024 | Lane | ................. | H04M 3/4931 |
| 2025/0047734 A1* | 2/2025 | Garrett | ................... | H04L 65/80 |

* cited by examiner

702 — RECEIVE FIRST INVITE MESSAGE FOR AUDIO CALL FROM INTERCOM DEVICE

704 — TRANSMIT SECOND INVITE MESSAGE TO VOIP DEVICE

706 — DETERMINE WHETHER INTERCOM DEVICE AND VOIP DEVICE HAVE VIDEO CAPABILITY

708 — ELEVATE AUDIO CALL TO VIDEO CALL

710 — TRANSMIT THIRD INVITE MESSAGE TO INTERCOM DEVICE

712 — FORWARD VIDEO DATA FROM INTERCOM DEVICE TO VOIP DEVICE

VIDEO INTERCOM COMMUNICATION FOR VOIP DEVICE

FIELD

This disclosure generally relates to voice over internet protocol (VOIP) device communication, and, more specifically, to VOIP device communication with a video intercom device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

Enterprise customers have long relied upon on-premises PBXs to deliver phone communications over voice over internet protocol (VOIP), integrated services digital network (ISDN), and analog approaches. In recent years, cloud-based PBX approaches, or simply cloud PBXs, have been introduced to implement traditional PBX functionality in a virtual manner. Thus, rather than relying upon large hardware solutions on-site, cloud PBX customers may use data center hardware to achieve the same call routing and other functionality of a conventional PBX.

Conventional cloud PBX systems (e.g., of UCaaS platforms) are configured for VOIP communications and cannot accommodate video media. These conventional cloud PBX systems route calls through a backend server (e.g., a freeswitch server) and do not support session initiation protocol (SIP) video communications between video intercom devices (e.g., video doorbells) and VOIP devices (e.g., desktop phones). Since the backend server of the conventional cloud PBX system is configured for VOIP communications, these systems cannot accommodate video media. Typical video media has a much higher bandwidth requirement (e.g., 5-10 Mbps) than audio media (e.g., less than 100 kbps). Streaming video calls via a conventional cloud PBX system can overwhelm the system and result in degraded call quality and overall performance, and in some instances, can crash the system entirely. Accordingly, calls between conventional VOIP devices and video intercom devices over conventional cloud PBX systems are limited to audio-only calls.

Implementations of this disclosure address problems such as these by elevating an audio call from the video intercom device to a video call and bypassing the backend server to route the video call directly to the session border controller (SBC) of the cloud PBX system. By elevating the audio call to a video call, video data can be sent from the video intercom device to the VOIP device via the SBC. The video data can be sent via the SBC using a secure real-time protocol (SRTP).

Figure 1:
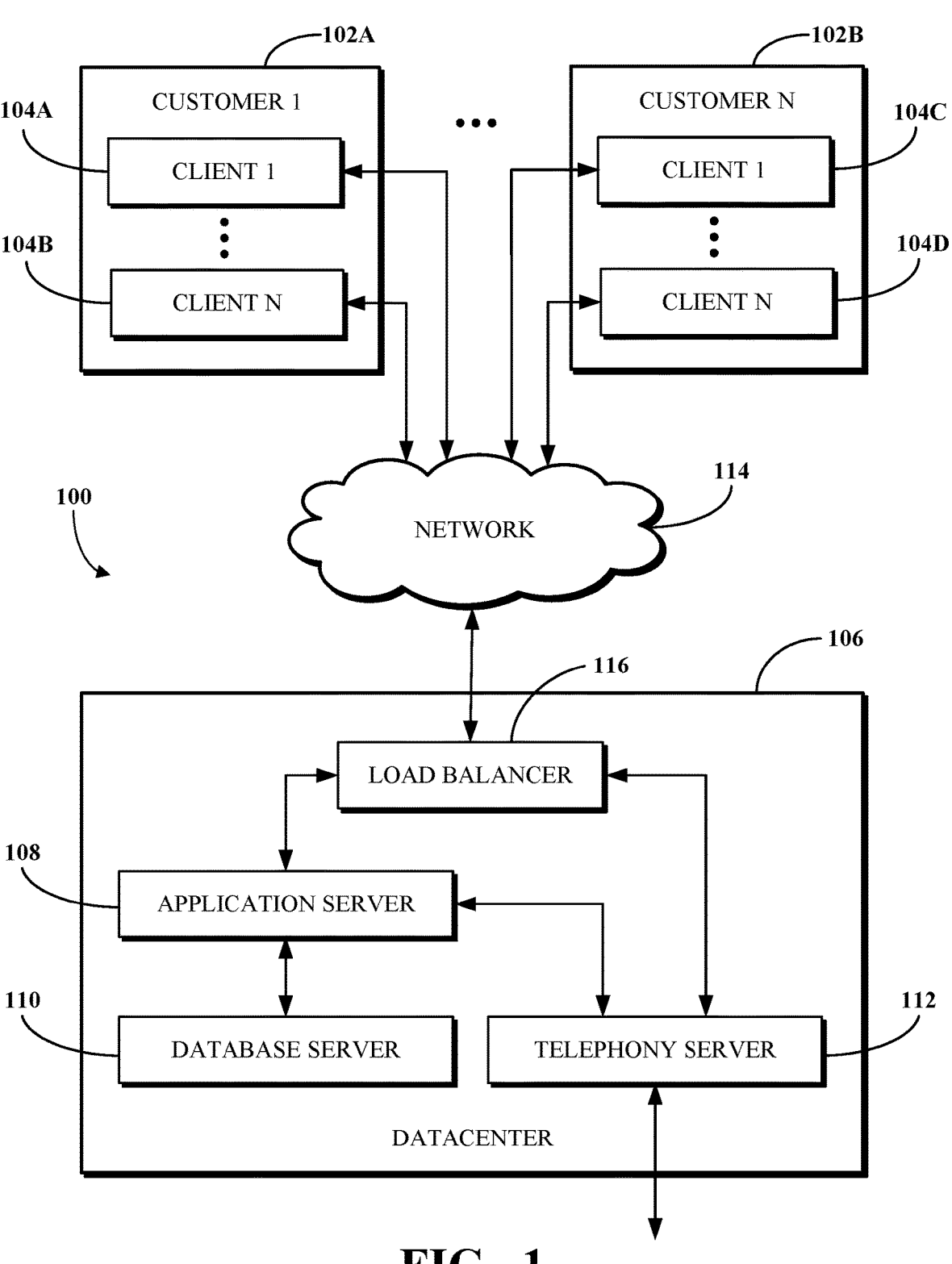
FIG. 1 is a block diagram of an example of an electronic computing and communications system.

To describe some implementations in greater detail, reference is first made to examples of hardware and software structures used to implement a system for supporting video communications between VOIP devices and video intercom devices. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be VOIP-enabled devices configured to send and receive calls over a network 114. The telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based PBX system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
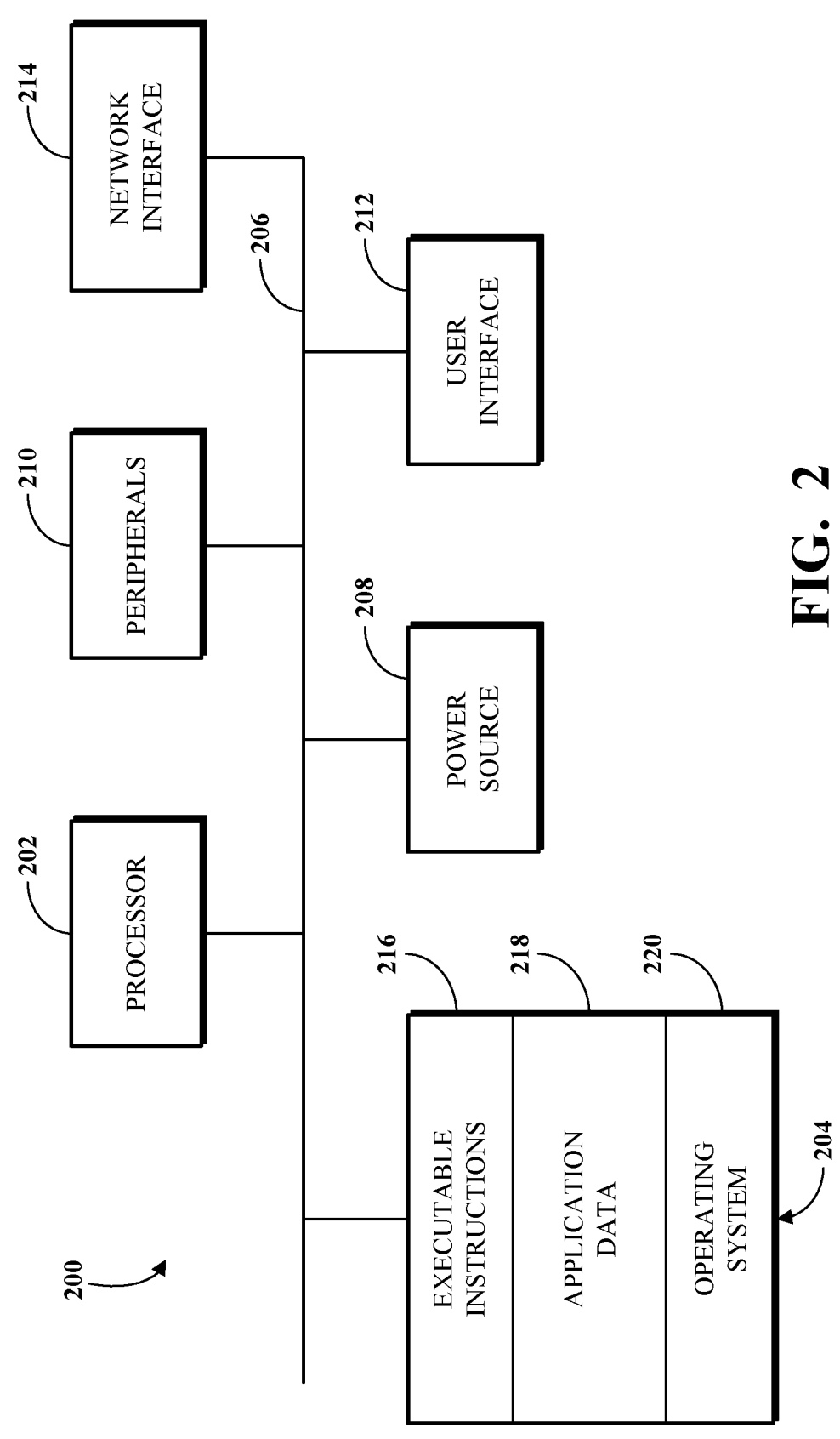
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
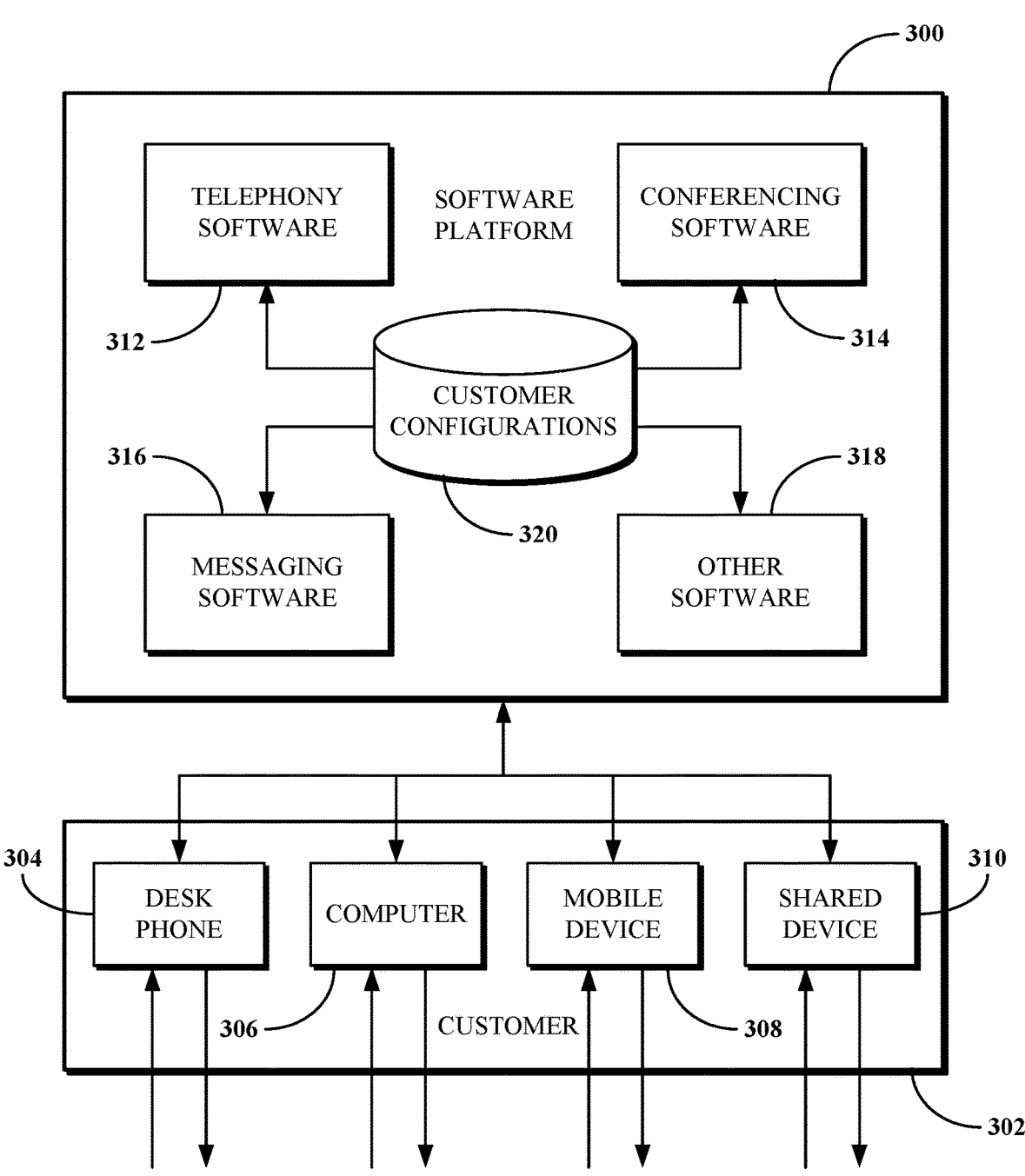
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, a video intercom device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for enabling communications between video intercom devices and VOIP devices. In some such cases, the telephony software 312 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through

318 may be combined into a single software application run on clients of the customer, such as one or more of the clients 304 through 310.

Figure 4:
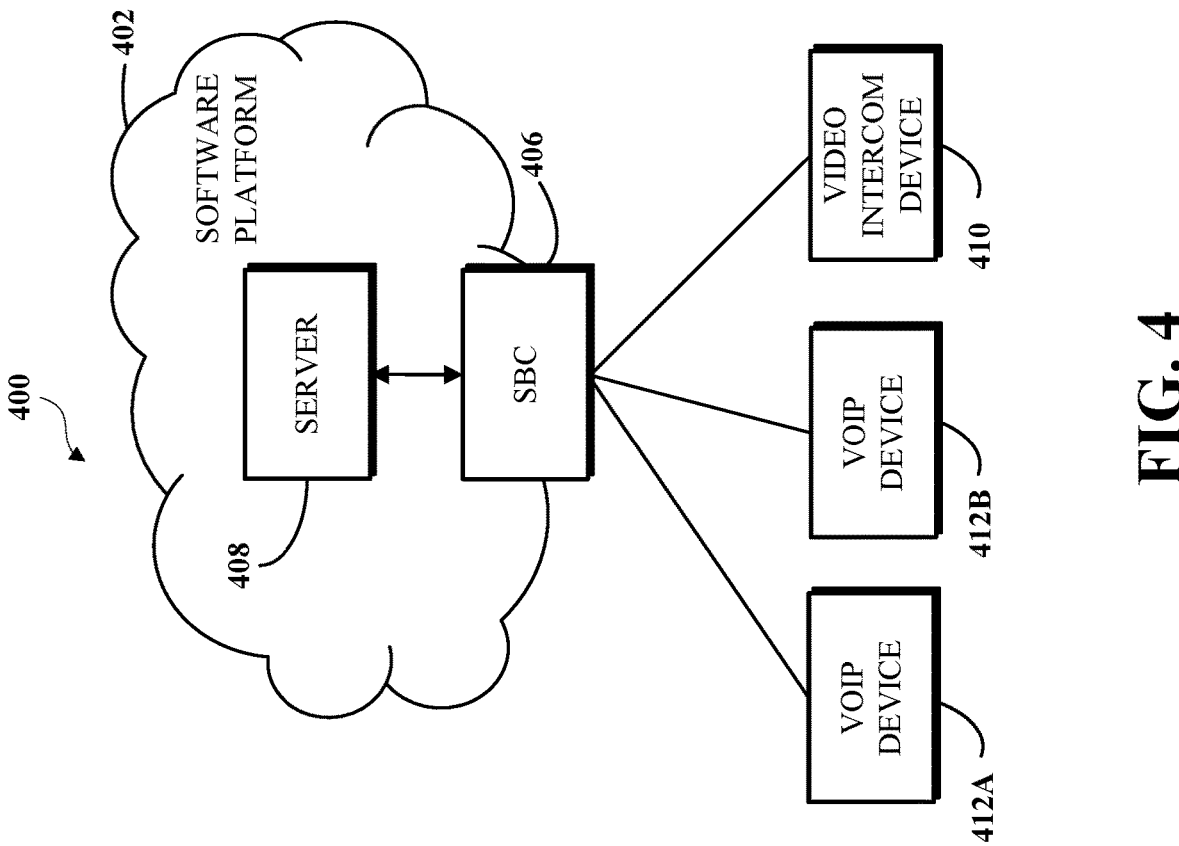
FIG. 4 is a block diagram of an example of a communications system for VOIP communications.

FIG. 4 is a block diagram of an example of a communications system 400 for VOIP communications. The communications system 400 may be implemented on a UCaaS platform. The communications system 400 includes a software platform 402. The software platform 402 may be the software platform 300 shown in FIG. 3.

The software platform 402 includes an SBC 406, and a server 408. The SBC 406 is communicatively coupled to the server 408. The SBC 406 can act as an intermediary to transmit and receive SIP requests and responses between clients or non-client devices (e.g., video intercom device 410, VOIP device 412A, and/or VOIP device 412B). Two VOIP devices 412A, 412B are shown for simplicity and clarity, and it is understood that the communications system 400 may include any number of VOIP devices. The VOIP devices 412A, 412B may be associated with the telephony server 402. The VOIP devices 412A, 412B may be any one of the desk phone 304, the computer 306, the mobile device 308, or the shared device 310 shown in FIG. 3.

Figure 5A:
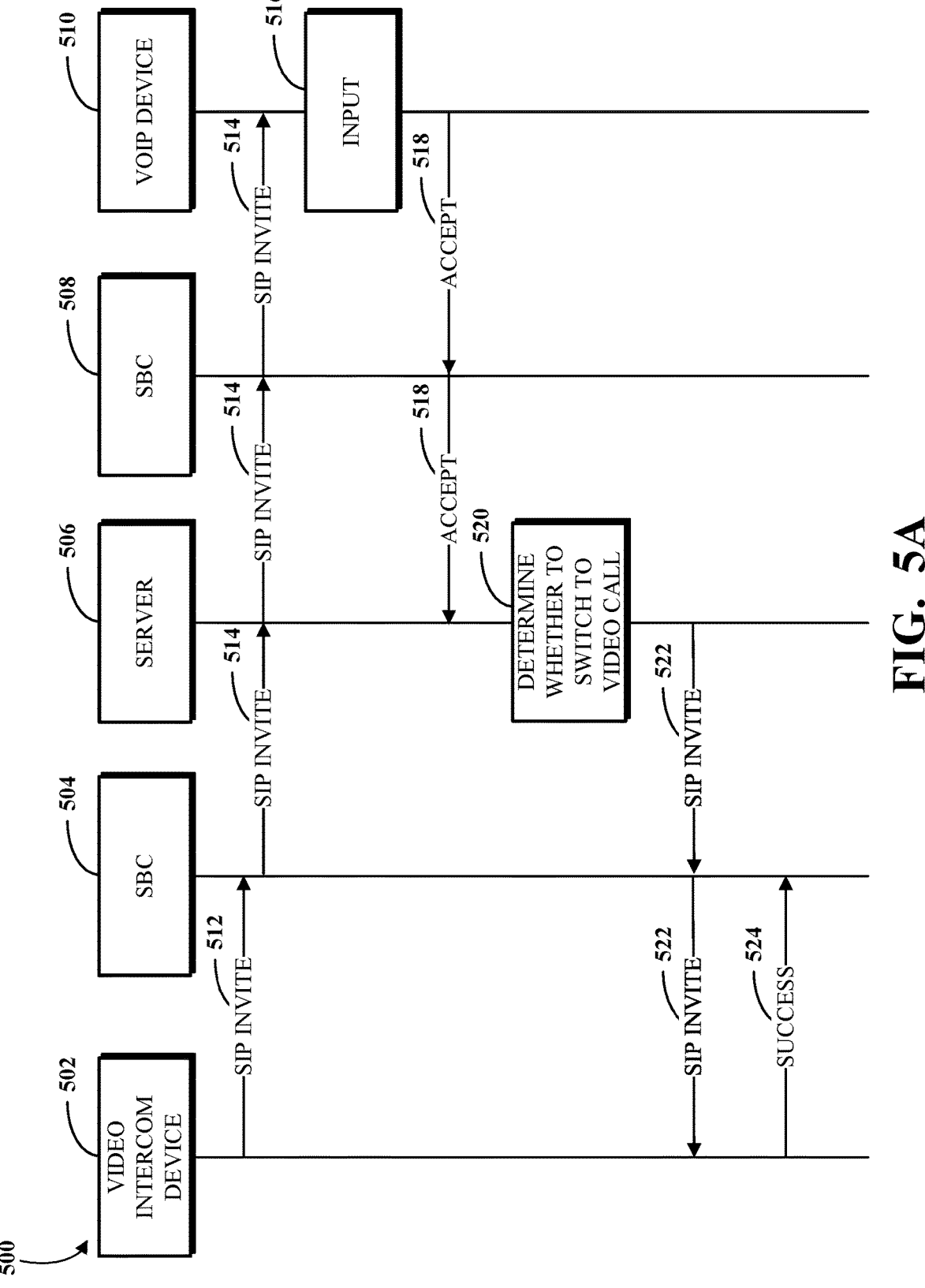
FIGS. 5A and 5B are collectively a swim lane diagram of an example of a communications system configured to communicate with a video intercom device.
Figure 5B:
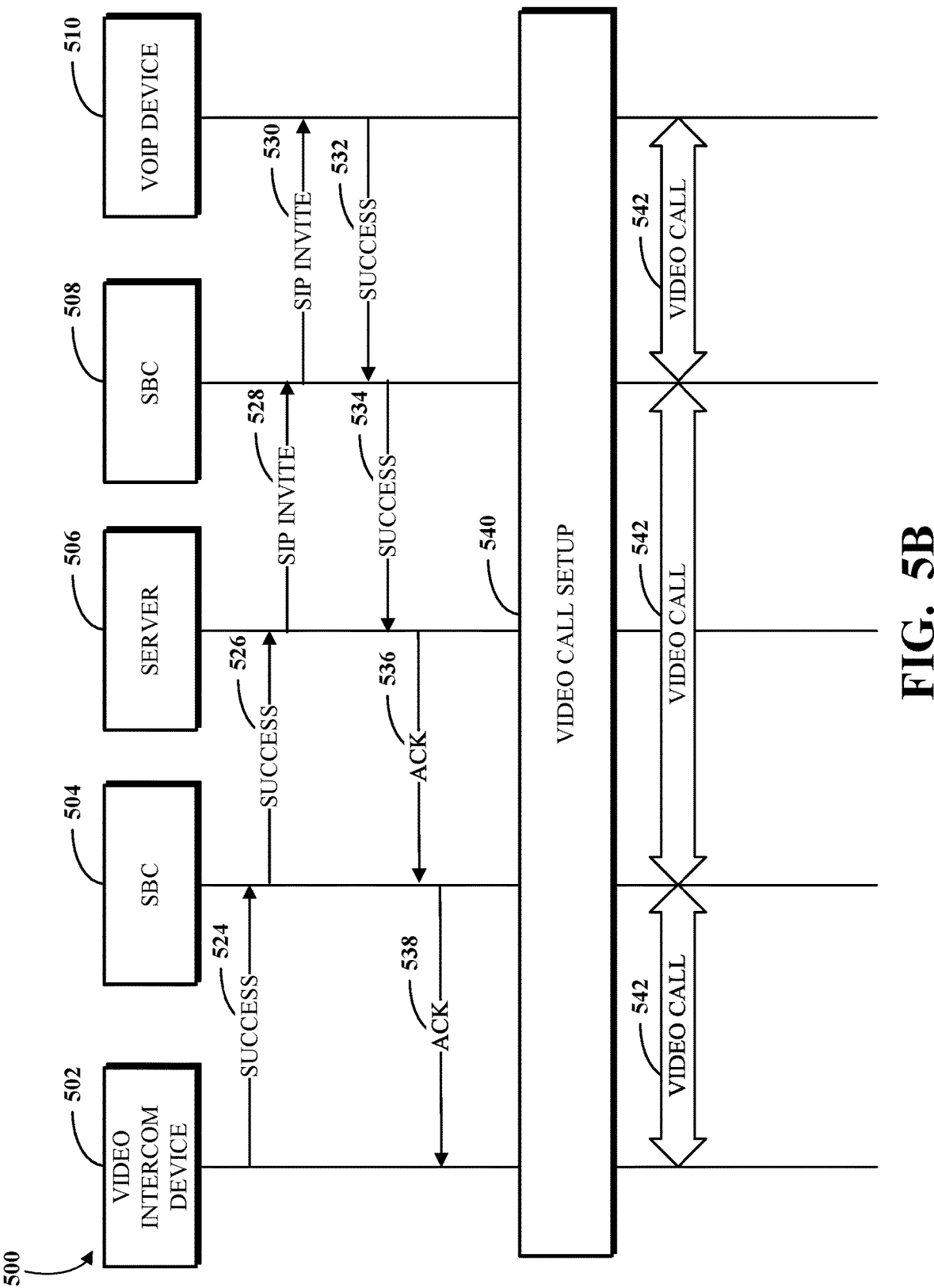

FIGS. 5A and 5B are collectively a swim lane diagram of an example of a communications system 500 configured to communicate with a video intercom device 502. The communications system 500 may be the communications system 400 shown in FIG. 4. The communications system 500 includes the video intercom device 502, an SBC 504, a server 506, an SBC 508, and a VOIP device 510. The SBC 504 is associated with the video intercom device 502 and the SBC 508 is associated with the VOIP device 510. The SBC 504 and/or the SBC 508 may be the SBC 408 shown in FIG. 4 and configured to communicate with the video intercom device 502 and/or the VOIP device 510. The video intercom device 502 may be the video intercom device 410 shown in FIG. 4. The video intercom device 502 is a device that has video capability, such as a video doorbell, for example. The VOIP device 510 may be one of the VOIP devices 412A or 412B shown in FIG. 4.

The video intercom device 502 is configured to transmit a SIP invite message 512 to the SBC 504. The SIP invite message 512 is transmitted to establish an audio call with the VOIP device 510. The SIP invite message 512 may be transmitted in response to an input, such as a button press, a detection of motion, a detection of sound, or another input. The SIP invite message 512 may include one or more fields, such as a name and number field. The server 506 may obtain a video intercom device identifier (ID) from a database based on the video intercom device name and number field. The server 506 may obtain a device option from the database based on the video intercom device ID. The video intercom device ID may be generated by the system when customers add the video intercom device 502 to the system. The device option may be set by the customer and used as a condition for the elevation of the audio call to a video call. In some examples, the SIP invite message 512 may include the video intercom device ID field, a video intercom device address field, a video intercom device capability field, a SIP invite message indicator field, a VOIP device ID field, a VOIP device address field, a call type field, another field, or any combination thereof. The video intercom device ID field may include a unique ID associated with the video intercom device 502 to identify the video intercom device 502, such as a name of the video intercom device 502. The video intercom device address field may include an address of the video intercom device 502, such as a medium access control (MAC) address or an IP address. The video intercom capability field may include one or more capabilities of the video intercom device 502, such as a video capability. The SIP invite message indicator field indicates the SIP invite message 512 transmitted by the video intercom device 502. The VOIP device ID field may include a unique ID associated with the VOIP device 510 to identify the VOIP device 510, such as a name of the VOIP device 510. The VOIP device address field may include an address of the VOIP device 510, such as a MAC address or an IP address. The call type field may include a type of call that the video intercom device is attempting to place, such as an audio call or a video call.

The SBC 504 receives the SIP invite message 512 from the video intercom device 502 and transmits a SIP invite message 514 to the server 506. The server 506 forwards the SIP invite message 514 to the SBC 508. The SBC 508 forwards the SIP invite message 514 to the VOIP device 510. The SIP invite message 514 is transmitted to indicate that the video intercom device 502 has transmitted the SIP invite message 512 to establish an audio call with the VOIP device 510. The SIP invite message 514 may include one or more fields, such as a video intercom device name and number field that can be used by the VOIP device 510 to display the name and number of the video intercom device 502 on a display of the VOIP device 510. In some examples, the SIP invite message 514 may include a video intercom device ID field, a video intercom device address field, a SIP invite message indicator field, a VOIP device ID field, a VOIP device address field, a call type field, another field, or any combination thereof.

The VOIP device 510 receives the SIP invite message 514 from the SBC 508. The SIP invite message 514 may cause the VOIP device 510 to ring and/or display a notification of the audio call from the video intercom device 502. The VOIP device 510 obtains an input 516 responsive to the ring and/or display of the notification. The input 516 may be a touch input, a gesture input, a keyboard input, a mouse input, an input associated with picking up a receiver of the VOIP device 510, or another input. The VOIP device 510 transmits an accept message 518 responsive to the input. The accept message 518 may be a 200 OK message that indicates that the VOIP device 510 accepts the audio call from the video intercom device 502 and includes a VOIP device name and number. The server 506 may obtain the VOIP device ID from a database based on the VOIP device name and number field. The server 506 may obtain a device option from the database based on the VOIP device ID. The VOIP device ID may be generated by the system when customers add the VOIP device 510 to the system. The device option may be set by customers. The device option may be used as another condition for the elevation of the audio call to a video call.

The SBC 508 receives the accept message 518 from the VOIP device 510 and forwards the accept message 518 to the server 506. The server 506 receives the accept message 518 from the SBC 508. The server 506 may obtain the VOIP device ID from a database based on the VOIP device name and number in the accept message 518. The server 506 may obtain a device option from the database based on the VOIP device ID. The server 506 determines 520 whether to switch the audio call to a video call. Details of how the server 506 makes this determination is discussed in reference to FIG. 8. When a determination is made to switch the audio call to a video call, the server 506 transmits a SIP invite message 522 (without a session description protocol (SDP)) to the SBC 504. The SBC 504 forwards the SIP invite message 522 to the video intercom device 502. The SIP invite message 522 may include an indicator that indicates that the audio call has been elevated to a video call. The video intercom device 502 receives the SIP invite message 522 and transmits a success message 524 to the SBC 504 to indicate initiation of elevating the audio call to a video call. The success message 524 may be a 200 OK message. The SBC 504 receives the success message 524 and generates a success message 526 that includes an SDP with the network address of the SBC 504. The success message 526 is a SIP message that includes an SDP that indicates the network address of the SBC 504 for which traffic of the video call is to be sent. The SBC 504 transmits the success message 526 to the server 506. The server 506 receives the success message 526 and generates a SIP invite message 528. The SIP invite message 528 is a SIP message that includes an SDP with the network address of the SBC 504. The server transmits the SIP invite message 528 to the SBC 508. The SBC 508 receives the SIP invite message 528 and generates a SIP invite message 530. The SBC 508 transmits the SIP invite message 530 to the VOIP device 510. The VOIP device 510 receives the SIP invite message 530 and transmits a success message 532 to the SBC 508. The success message 532 may be a 200 OK message. The SBC 508 receives the success message 532 and generates a success message 534. The success message 534 is a SIP message and may be a 200 OK message that includes an SDP with the network address of the SBC 508 for which traffic of the video call is to be sent. The SBC 508 transmits the success message 534 to the server 506. The server 506 receives the success message 534 and generates an acknowledgement (ACK) message 536. The ACK message 536 is a SIP message that includes an SDP with the network address of the SBC 508. The server transmits the ACK message 536 to the SBC 504. The SBC 504 receives the ACK message 536 and generates an ACK message 538. The SBC 504 transmits the ACK 538 to the video intercom device 502. The SBC 504 may negotiate with the SBC 508 and/or the VOIP device 510 to determine a real-time protocol (RTP) to use to transmit the video data associated with the video call from the video intercom device 502. The video call may be set up 540 in response to the video intercom device 502 receiving the ACK message 538. The video call 542 may be conducted using the determined RTP. For example, the video call 542 may be conducted using SRTP messages. The flow of the video call 542 bypasses the server 506 such that the video data associated with the video call 542 is transmitted between the SBC 504 and the SBC 508. The VOIP device 510 receives the video data from the SBC 508 and displays the video data on a display of the VOIP device 510. In this way, a caller from the video intercom device 502 can be viewed on the display of the VOIP device 510.

Figure 6A:
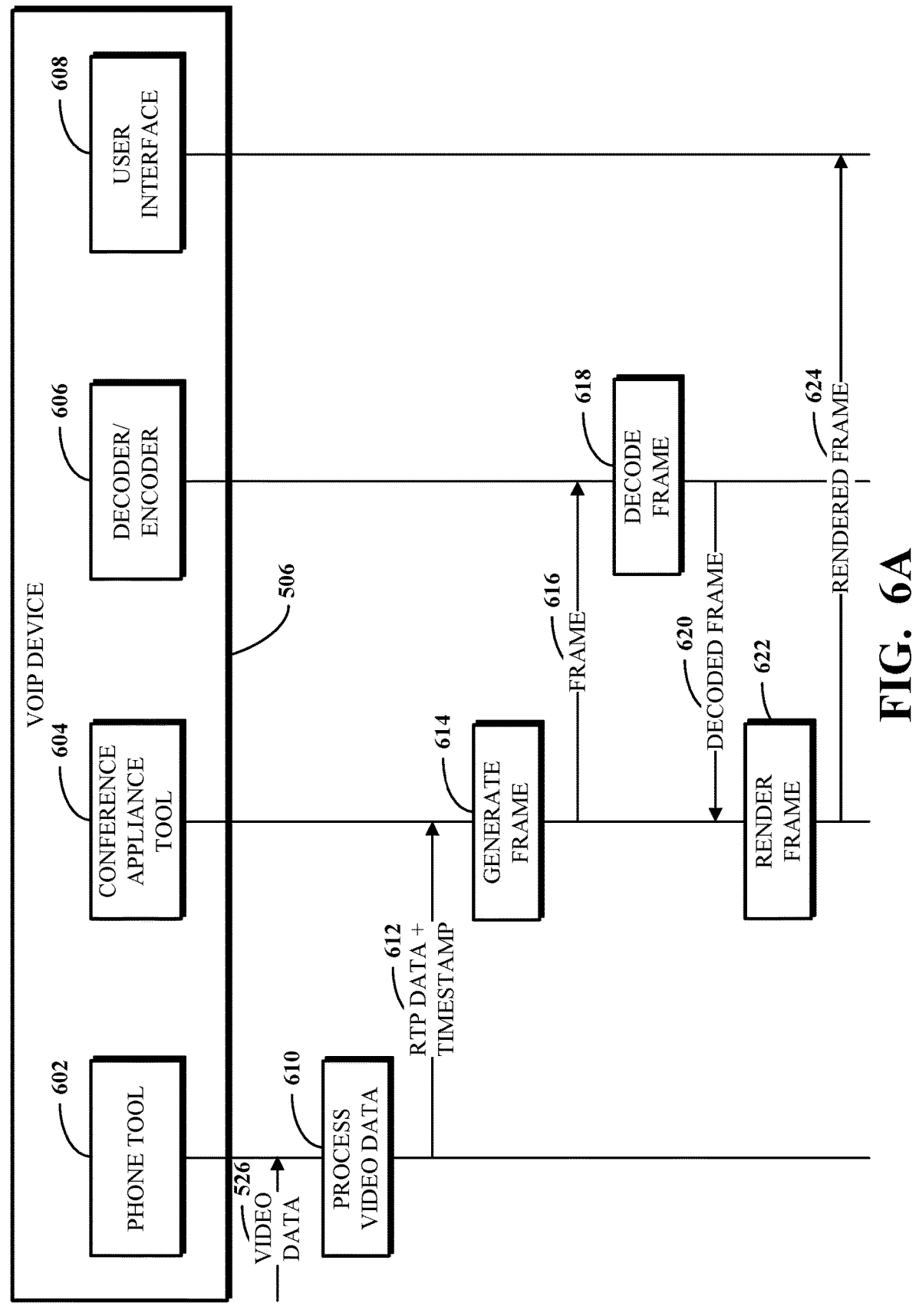
FIGS. 6A and 6B are swim lane diagrams of a VOIP device configured to communicate with a video intercom device.
Figure 6B:
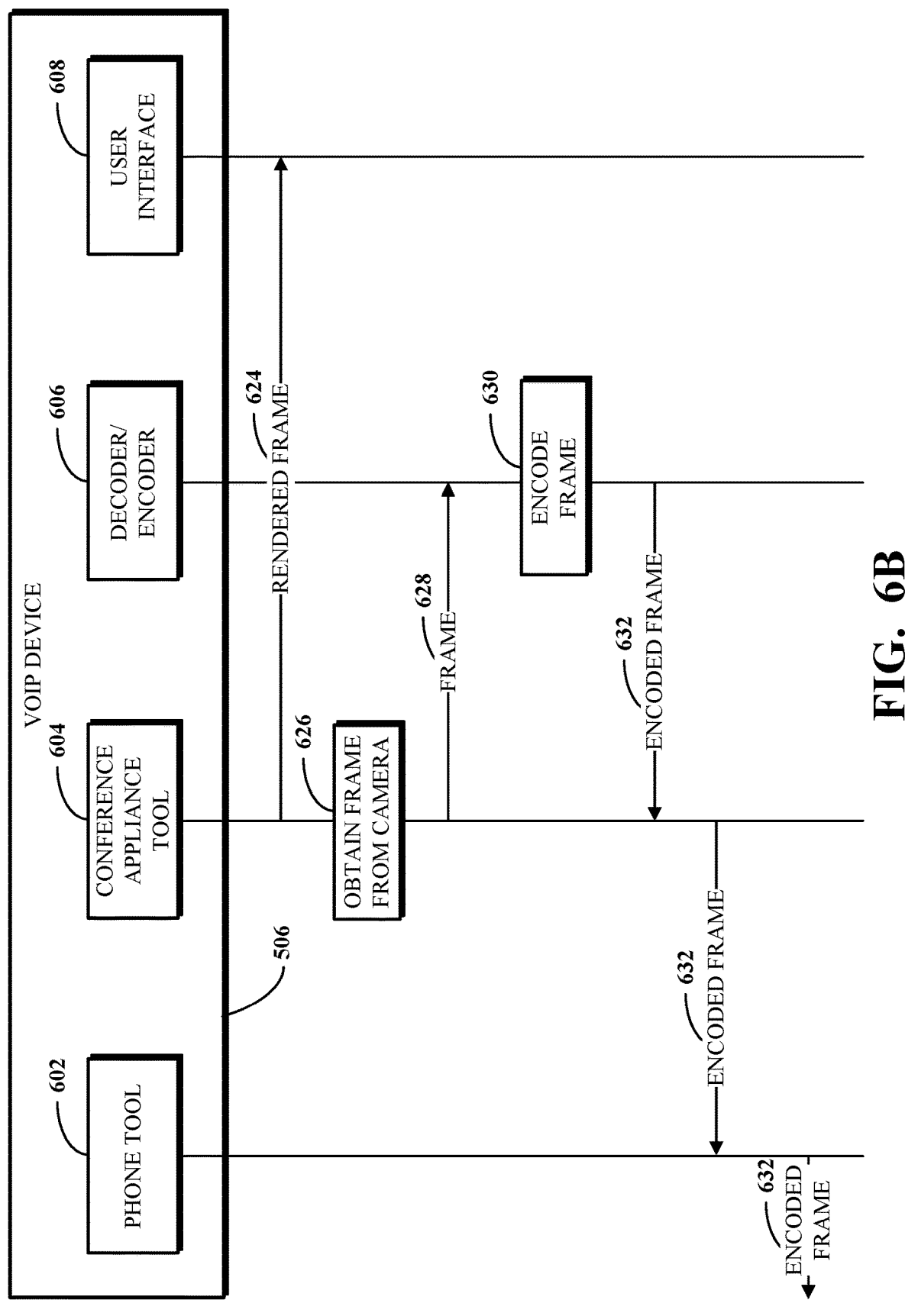

FIGS. 6A and 6B are swim lane diagrams of the VOIP device 506 shown in FIG. 5 configured to communicate with a video intercom device. The VOIP device 506 includes a phone tool 602, a conference appliance tool 604, a decoder/encoder 606, and a user interface 608.

The phone tool 602 is configured to receive the video data 526 from the SBC 504 shown in FIG. 5. The phone tool 602 processes 610 the video data 526 received from the SBC 504. The processing of the video data 526 may include one or more of determining analytical statistics, decrypting the video data 526, parsing RTP data from the video data 526, and/or obtaining an audio timestamp. The phone tool 602 is configured to transmit the RTP data and timestamp 612 to the conference appliance tool 604.

The conference appliance tool 604 is configured to receive the RTP data and timestamp 612 from the phone tool 602 and generate 614 a frame 616. The frame 616 is a video frame obtained from a video stream (e.g., video data 526) from the video intercom device 502, shown in FIG. 5. The frame 616 is generated based on the RTP data and the timestamp. The conference appliance tool 604 transmits the frame 616 to the decoder/encoder 606. The decoder/encoder 606 is configured to receive the frame 616 and decode 618 the frame 616 to obtain a decoded frame 620. The decoder/encoder 606 transmits the decoded frame 620 to the conference appliance tool 604.

The conference appliance tool 604 receives the decoded frame 620 from the decoder/encoder and renders 622 the decoded frame 620 to obtain a rendered frame 624. The rendered frame 624 may be obtained using an H.264 codec. The conference appliance tool 604 outputs the rendered frame 624 to the user interface 608 for display.

Referring to FIG. 6B, if the VOIP device 506 has a built-in camera or is otherwise connected to a camera, the conference appliance tool 604 obtains 626 a frame 628 from the camera when the rendered frame 624 is transmitted to the user interface 608. The conference appliance tool 604 transmits the frame 628 to the decoder/encoder 606. The decoder/encoder 606 receives the frame 628 from the conference appliance tool 604 and encodes 630 the frame 628 to obtain an encoded frame 632. The decoder/encoder 606 transmits the encoded frame 632 to the conference appliance tool 604. The conference appliance tool 604 receives the encoded frame 632 and forwards the encoded frame 632 to the phone tool 602. The phone tool 602 receives the encoded frame 632 from the conference appliance tool 604 and forwards the encoded frame 632 to the SBC 504 shown in FIG. 5. The SBC 504 forwards the encoded frame 632 to the video intercom device 502 shown in FIG. 5 for display (not shown).

Figure 7:
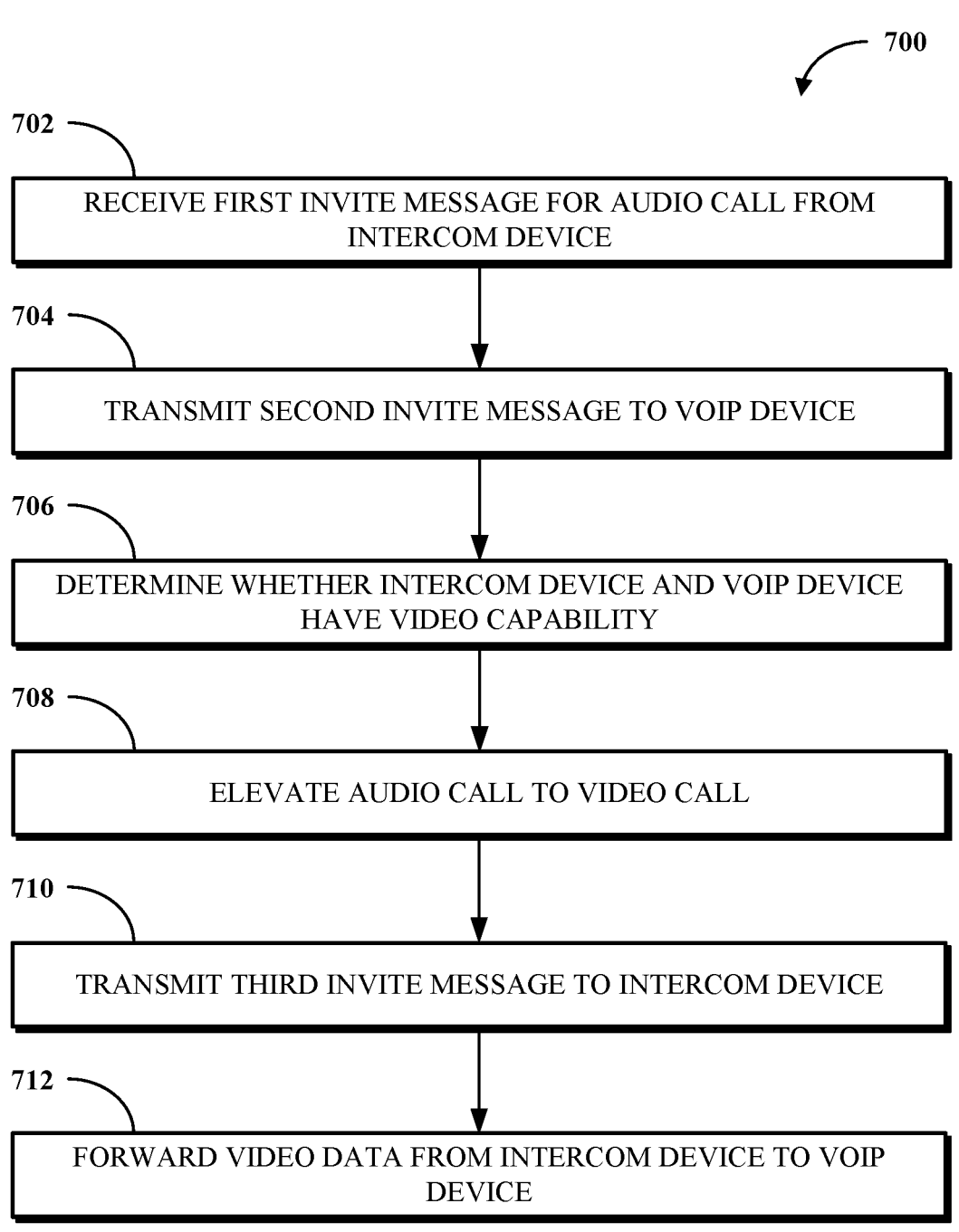
FIG. 7 is a flowchart of an example of a method for VOIP device communication with a video intercom device.
Figure 8:
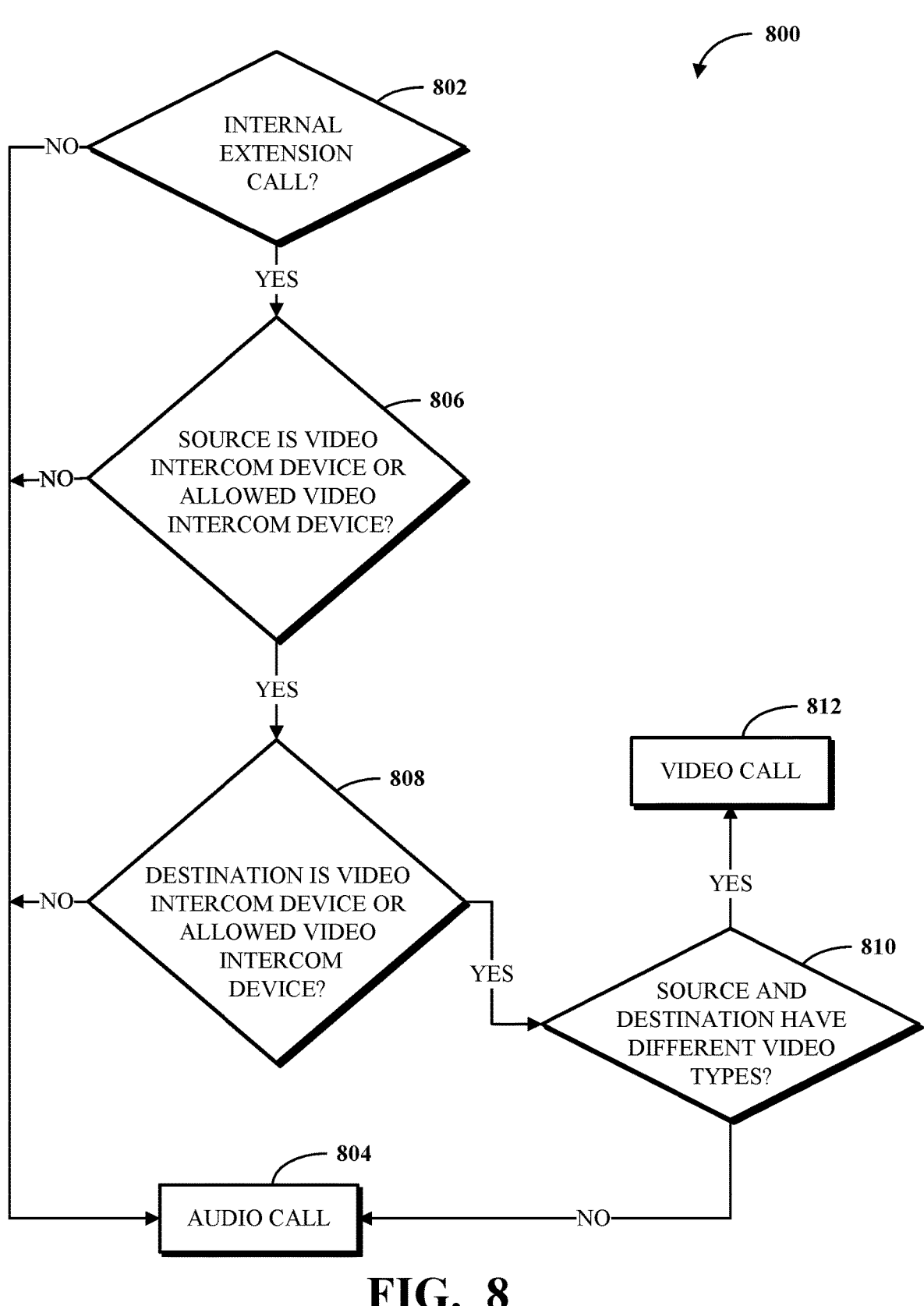
FIG. 8 is a flowchart of an example of a method for determining whether to switch from an audio call to a video call.

To further describe some implementations in greater detail, reference is next made to examples of techniques which may be performed by or using a system for supporting video communications between VOIP devices and video intercom devices. FIG. 7 is a flowchart of an example of a method 700 for VOIP device communication with a video intercom device. FIG. 8 is a flowchart of an example of a method 800 for determining whether to switch from an audio call to a video call. The methods can be executed using computing devices, such as the systems, hardware, and software described with respect to FIGS. 1-6B. The methods can be performed, for example, by executing a machine-readable program or other computer-executable instructions, such as routines, instructions, programs, or other code. The steps, or operations, of the methods, or another technique, method, process, or algorithm described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations of the methods in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, the method 700 includes receiving a first invite message from an intercom device. The first invite message may be a SIP invite message. The first invite message may be transmitted from the intercom device to establish an audio call with a VOIP device. In some examples, the first invite message may include one or more capabilities of the intercom device. For example, the first invite message may include an indicator that the intercom device has video capability. The intercom device may be a video intercom device, such as a video doorbell.

At 704, the method 700 includes transmitting a second invite message to the VOIP device. The second invite message may be a SIP message indicates that the first SIP invite message was received at the SBC from the intercom device. In some examples, the second invite message may include one or more of an intercom device ID field, an intercom device address field, a SIP invite message indicator field, a VOIP device ID field, a VOIP device address field, or a call type field. The VOIP device may accept the audio call by transmitting an accept message (e.g., a 200 OK message) to the video intercom device via the server. Transmission of the accept message indicates that the audio call is set up successfully.

After the set up of the audio call, the server determines whether to switch the audio call to a video call by checking the device options of the video intercom device and the VOIP device based on a name and number of the respective devices. For example, at 706, the method 700 includes determining whether the intercom device and the VOIP device each have video capability. In some cases, the video capability of each of the intercom device and the VOIP device may be determined based on a video intercom device capability field of the first invite message and/or a VOIP device capability field of an accept message received from the VOIP device. In other cases, the video capability of each of the intercom device and the VOIP device may be determined from a lookup table (LUT). The LUT may be stored on an SBC or on a server.

At 708, the method 700 includes, based on a determination that the intercom device and the VOIP device both have video capability, elevating the audio call to a video call.

At 710, the method 700 includes transmitting a third invite message to the intercom device. The third invite message may include an indicator that indicates that the audio call has been elevated to a video call.

At 712, the method 700 includes forwarding video data from the intercom device to the VOIP device. The video data may be received from the intercom device based on the indicator that indicates that the audio call has been elevated to a video call. The video data may be forwarded using an RTP that is negotiated between the SBC and the VOIP device. In an example, the negotiated RTP may be an SRTP.

FIG. 8 is a flowchart of an example of a method 800 for determining whether to switch from an audio call to a video call. At 802, the method 800 include determining whether the call in an internal extension call (e.g., a call from an internal extension to another internal extension). If it is determined that the call is not an internal extension call, the call is handled as an audio call 804 (i.e., the call remains as an audio call). If it is determined that the call is an internal extension call, the method 800 includes determining at 806 whether the source of the call is a video intercom device or an allowed video intercom device. If it is determined that the source of the call is not a video intercom device or an allowed video intercom device, the call is handled as an audio call 804. If it is determined that the source of the call is a video intercom device or an allowed video intercom device, the method 800 includes determining at 808 whether the destination is a video intercom device or an allowed video intercom device. If it is determined that the destination is not a video intercom device or an allowed video intercom device, the call is handled as an audio call 804. If it is determined that the destination is a video intercom device or an allowed video intercom device, the method 800 includes determining at 810 whether the source and the destination have different video types. If it is determined that the source and the destination have the same video types, the call is handled as an audio call 804. If it is determined that the source and the destination have different video types, the call is elevated to a video call at 812.

An aspect may include a method that includes receiving a first SIP invite message from an intercom device to establish an audio call with a VOIP device. The method may include transmitting, to the VOIP device, a second SIP invite message that indicates the first SIP invite message from the intercom device. The method may include determining whether each of the intercom device and the VOIP device have video capability. The method may include elevating the audio call to a video call based on a determination that both the intercom device and the VOIP device have video capability. The method may include transmitting a third SIP invite message that indicates elevation of the audio call to the video call. The method may include forwarding video data received from the intercom device to the VOIP device.

An aspect may include a system that includes an SBC. The SBC may be configured to receive a first SIP invite message from an intercom device to establish an audio call with a VOIP device. The SBC may be configured to transmit, to the VOIP device, a second SIP invite message that indicates the first SIP invite message from the intercom device. The SBC may be configured to determine whether each of the intercom device and the VOIP device have video capability. The SBC may be configured to elevate the audio call to a video call based on a determination that both the intercom device and the VOIP device have video capability. The SBC may be configured to transmit a third SIP invite message that indicates elevation of the audio call to the video call. The SBC may be configured to forward video data received from the intercom device to the VOIP device.

An aspect may include a non-transitory computer-readable medium comprising instructions that when executed by one or more processors, causes the one or more processors to perform operations. The operations may include receiving a first SIP invite message from an intercom device to establish an audio call with a VOIP device. The operations may include transmitting, to the VOIP device, a second SIP invite message that indicates the first SIP invite message from the intercom device. The operations may include determining whether each of the intercom device and the VOIP device have video capability. The operations may include elevating the audio call to a video call based on a determination that both the intercom device and the VOIP device have video capability. The operations may include transmitting a third SIP invite message that indicates elevation of the audio call to the video call. The operations may include forwarding video data received from the intercom device to the VOIP device.

In one or more aspects, the video data may be based on a real-time protocol, such as a secure real-time protocol. In one or more aspects, a real-time protocol negotiation may be performed with the VOIP device prior to forwarding the video data. In one or more aspects, the first SIP invite message may include one or more capabilities of the intercom device. In one or more aspects, an accept message may be received from the VOIP device responsive to the second SIP invite message. In one or more aspects, the determination of whether each of the intercom device and the VOIP device have video capability may be based on a first indicator in the first SIP invite message and a second indicator in the accept message. In one or more aspects, a server may be configured to receive an accept message from the VOIP device responsive to the second SIP invite message. In one or more aspects, the accept message may include a video capability of the VOIP device. In one or more aspects, the first SIP invite message may include one or more of an intercom device name field, an intercom device number field, an intercom device ID field, an intercom device address field, an intercom device capability field, a SIP invite message indicator field, a VOIP device ID field, a VOIP device address field, or a call type field. In one or more aspects, the second SIP invite message may include one or more of an intercom device name field, an intercom device number field, an intercom device ID field, an intercom device address field, a SIP invite message indicator field, a VOIP device ID field, a VOIP device address field, or a call type field. In one or more aspects, the accept message may be received from the VOIP device responsive to an input. In one or more aspects, the input may be a touch input, a gesture input, a keyboard input, a mouse input, or an input associated with picking up a receiver of the VOIP device.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving a first session initiation protocol (SIP) invite message from an intercom device to establish an audio call with a voice over internet protocol (VOIP) device;
transmitting, to the VOIP device, a second SIP invite message that indicates the first SIP invite message from the intercom device;
determining whether each of the intercom device and the VOIP device have video capability, wherein determining whether each of the intercom device and the VOIP device have video capability comprises:
obtaining a video intercom device capability field from the first SIP invite message and a VOIP device capability field from an accept message received from the VOIP device, and
determining based on the video intercom device capability field and the VOIP device capability field, whether the intercom device and the VOIP device each have video capability;
elevating the audio call to a video call based on a determination that both the intercom device and the VOIP device have video capability, wherein elevating the audio call to the video call includes bypassing a backend server and routing video data directly to a session border controller (SBC) of a cloud private branch exchange (PBX) system;
transmitting a third SIP invite message that indicates elevation of the audio call to the video call; and
forwarding video data received from the intercom device to the VOIP device, wherein the video data is sent via the SBC using a secure real-time protocol (SRTP).

2. The method of claim 1, wherein the video data is based on a secure real-time protocol.

3. The method of claim 1, further comprising:
performing a real-time protocol negotiation with the VOIP device prior to forwarding the video data.

4. The method of claim 1, wherein the first SIP invite message includes one or more capabilities of the intercom device.

5. The method of claim 1, further comprising:
receiving an accept message from the VOIP device responsive to the second SIP invite message.

6. The method of claim 5, wherein the accept message includes one or more capabilities of the VOIP device.

7. The method of claim 6, wherein determining whether each of the intercom device and the VOIP device have video capability is based on a first indicator in the first SIP invite message and a second indicator in the accept message.

8. A system, comprising:
a session border controller (SBC) configured to:
receive a first session initiation protocol (SIP) invite message from an intercom device to establish an audio call with a voice over internet protocol (VOIP) device;
transmit, to the VOIP device, a second SIP invite message that indicates the first SIP invite message from the intercom device;
determine whether each of the intercom device and the VOIP device have video capability, wherein the SBC is configured to:
obtain a video intercom device capability field from the first SIP invite message and a VOIP device capability field from an accept message received from the VOIP device, and
determine based on the video intercom device capability field and the VOIP device capability field whether the intercom device and the VOIP device each have video capability;
elevate the audio call to a video call based on a determination that both the intercom device and the VOIP device have video capability, wherein elevation of the audio call to the video call bypasses a background server and routes video data directly to an SBC of a cloud private branch exchange (PBX) system;
transmit a third SIP invite message that indicates elevation of the audio call to the video call; and
forward video data received from the intercom device to the VOIP device, wherein the video data is sent via the SBC using a secure real-time protocol (SRTP).

9. The system of claim 8, wherein the video data is based on a real-time protocol.

10. The system of claim 8, wherein the SBC is further configured to perform a protocol negotiation with the VOIP device prior to forwarding the video data.

11. The system of claim 8, wherein the first SIP invite message includes an indicator of a video capability of the intercom device.

12. The system of claim 8, further comprising:
a server configured to receive an accept message from the VOIP device responsive to the second SIP invite message.

13. The system of claim 12, wherein the accept message includes a video capability of the VOIP device.

14. The system of claim 8, wherein the SBC is configured to determine whether each of the intercom device and the VOIP device have video capability based on data obtained from a look up table.

15. A non-transitory computer-readable medium comprising instructions that when executed by one or more processors, causes the one or more processors to perform operations comprising:
receiving a first session initiation protocol (SIP) invite message from an intercom device to establish an audio call with a voice over internet protocol (VOIP) device;

transmitting, to the VOIP device, a second SIP invite message that indicates the first SIP invite message from the intercom device;

determining whether each of the intercom device and the VOIP device have video capability, wherein determining whether each of the intercom device and the VOIP device have video capability comprises:

obtaining a video intercom device capability field from the first SIP invite message and a VOIP device capability field from an accept message received from the VOIP device, and determining based on the video intercom device capability field and the VOIP device capability field, whether the intercom device and the VOIP device each have video capability;

elevating the audio call to a video call based on a determination that both the intercom device and the VOIP device have video capability, wherein elevating the audio call to the video call includes bypassing a backend server and routing video data directly to a session border controller (SBC) of a cloud private branch exchange (PBX) system;

transmitting a third SIP invite message that indicates elevation of the audio call to the video call; and forwarding video data received from the intercom device to the VOIP device, wherein the video data is sent via the SBC using a secure real-time protocol (SRTP).

16. The non-transitory computer-readable medium of claim 15, wherein the first SIP invite message includes one or more of an intercom device identifier (ID) field, an intercom device address field, an intercom device capability field, a SIP invite message indicator field, a VOIP device ID field, a VOIP device address field, or a call type field.

17. The non-transitory computer-readable medium of claim 15, wherein the second SIP invite message includes one or more of an intercom device identifier (ID) field, an intercom device address field, a SIP invite message indicator field, a VOIP device ID field, a VOIP device address field, or a call type field.

18. The non-transitory computer-readable medium of claim 15, further comprising:

receiving an accept message from the VOIP device responsive to an input.

19. The non-transitory computer-readable medium of claim 18, wherein the input is a touch input, a gesture input, a keyboard input, a mouse input, or an input associated with picking up a receiver of the VOIP device.

20. The non-transitory computer-readable medium of claim 18, wherein the accept message includes one or more capabilities of the VOIP device.

* * * * *